(12) United States Patent
Breese

(10) Patent No.: US 7,216,747 B2
(45) Date of Patent: May 15, 2007

(54) AMPLITUDE CONTROLLED ORIFICE VALVING

(75) Inventor: Darrell Breese, Ypsilanti, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 11/248,102

(22) Filed: Oct. 12, 2005

(65) Prior Publication Data

US 2006/0081431 A1    Apr. 20, 2006

Related U.S. Application Data (60) Provisional application No. 60/618,745, filed on Oct. 14, 2004.

(51) Int. Cl.
F16F 9/10 (2006.01)
F16F 9/34 (2006.01)

(52) U.S. Cl. .................. 188/315; 188/318; 188/322.13

(58) Field of Classification Search ................ 188/275, 188/286, 313, 314, 315, 318, 322.13, 316, 188/317, 322.14, 320, 287, 297
See application file for complete search history.

(56) References Cited

U.S. PATENT DOCUMENTS

| | | | | |
|---|---|---|---|---|
| 2,173,574 A * | 9/1939 | Binder et al. | ............... | 188/287 |
| 2,785,774 A * | 3/1957 | Long et al. | .................. | 188/313 |
| 3,321,210 A * | 5/1967 | Nedelko | ...................... | 188/313 |
| 4,838,392 A * | 6/1989 | Miller et al. | ................. | 188/315 |
| 4,971,180 A * | 11/1990 | Kobayashi et al. | ......... | 188/315 |
| 5,462,140 A * | 10/1995 | Cazort et al. | ................ | 188/275 |
| 5,522,486 A * | 6/1996 | Fulks et al. | .................. | 188/315 |
| 6,926,128 B2 * | 8/2005 | Barbison et al. | ............ | 188/315 |
| 2006/0124415 A1* | 6/2006 | Joly | ............................ | 188/315 |

FOREIGN PATENT DOCUMENTS

| GB | 2269437 A | * | 2/1994 |
|---|---|---|---|
| JP | 57137733 A | * | 8/1982 |
| JP | 58184336 A | * | 10/1983 |

* cited by examiner

*Primary Examiner*—Thomas Williams
(74) *Attorney, Agent, or Firm*—Harness, Dickey & Pierce, PLC (57) ABSTRACT

A dual tube shock absorber includes a spool valve located between the upper working chamber and the reserve chamber. The spool valve moves with the piston rod to open and close a flow path between the upper working chamber and the reserve chamber. This provides a low damping characteristic for small movements of the piston rod which changes to a high damping characteristic for larger movement of the piston rod.

12 Claims, 6 Drawing Sheets

AMPLITUDE CONTROLLED ORIFICE VALVING

FIELD OF THE INVENTION

The present invention relates generally to automotive dampers or shock absorbers which receive mechanical shock. More particularly, the present invention relates to a unique hydraulic valve assembly which allows greater tunability of the shock absorber, especially in the mode of low hydraulic fluid flow.

BACKGROUND OF THE INVENTION

Shock absorbers are used in conjunction with automotive suspension systems to absorb unwanted vibrations which occur during driving. To absorb these unwanted vibrations, shock absorbers are generally connected between the sprung portion (body) and the unsprung portion (suspension) of the automobile. A piston is located within a pressure tube of the shock absorber, with the piston being connected to the sprung portion of the automobile through a piston rod and the pressure tube being connected to the unsprung portion of the automobile. Because the piston is able, through valving, to limit the flow of damping fluid between opposite sides of the piston, when the shock absorber is compressed or extended, the shock absorber is able to produce a damping force which counteracts the unwanted vibration which would otherwise be transmitted from the unsprung portion to the sprung portion of the automobile. In a dual tube shock absorber, a fluid reservoir is defined between the pressure tube and the reservoir tube. A base valve can be located between the lower working chamber (the area below the piston) and the reservoir to limit the flow of fluid between the lower working chamber and the reservoir to produce a damping force which also counteracts the unwanted vibration which would otherwise be transmitted from the unsprung portion to the sprung portion of the automobile. The greater the degree to which the flow of fluid within the shock absorber is restricted by the piston and/or the base valving, the greater the damping forces which are generated by the shock absorber. Thus, a highly restricted flow of fluid would produce a firm ride while a less restricted flow of fluid would produce a soft ride.

In selecting the amount of damping that a shock absorber is to provide, at least three vehicle performance characteristics are considered. These three characteristics are ride comfort, vehicle handling and road holding ability. Ride comfort is often a function of the spring constant of the main springs of the vehicle as well as the spring constant of the seat, tires and the damping coefficient of the shock absorber. For optimum ride comfort, a relatively low damping force or a soft ride is preferred.

Vehicle handling is related to the variation in the vehicle's attitude (i.e., roll, pitch and yaw). For optimum vehicle handling, relatively large damping forces, or a firm ride, are required to avoid excessively rapid variations in the vehicle's attitude during cornering, acceleration and deceleration.

Finally, road holding ability is generally a function of the amount of contact between the tires and the ground. To optimize road handling ability, large damping forces, or a firm ride, are required when driving on irregular surfaces to prevent loss of contact between the wheel and the ground for excessive periods of time.

Various types of shock absorbers have been developed with multi-force damping force generating devices to generate the desired damping forces in relation to the various vehicle performance characteristics. Shock absorbers have been developed to provide different damping characteristics depending on the distance or the speed at which the piston moves within the pressure tube. Because of the exponential relation between pressure drop and flow rate, it is a difficult task to obtain a damping force at relatively low piston velocities, particularly at velocities near zero.

The continued development of hydraulic dampers includes the development of multi-force damping force generating devices which are simpler to manufacture, can be manufactured at a lower cost and which improve the desired force generating characteristics.

SUMMARY OF THE INVENTION

The present invention provides the art with a multi-stage hydraulic damper or shock absorber that provides damping which varies according to the stroke amplitude. Soft damping is provided for small strokes and firm damping is provided for large strokes. The variable damping is provided by a sliding piston that is frictionally held in place on the piston rod inside of the pressure cylinder. While the shock absorber undergoes a small stroke, the sliding sleeve moves with the piston rod and the fluid flows through a separate flow path to provide a soft damping. When the shock absorber undergoes a large stroke, the sliding sleeve moves against a stop to close off the flow path which in turn provides a firm damping.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
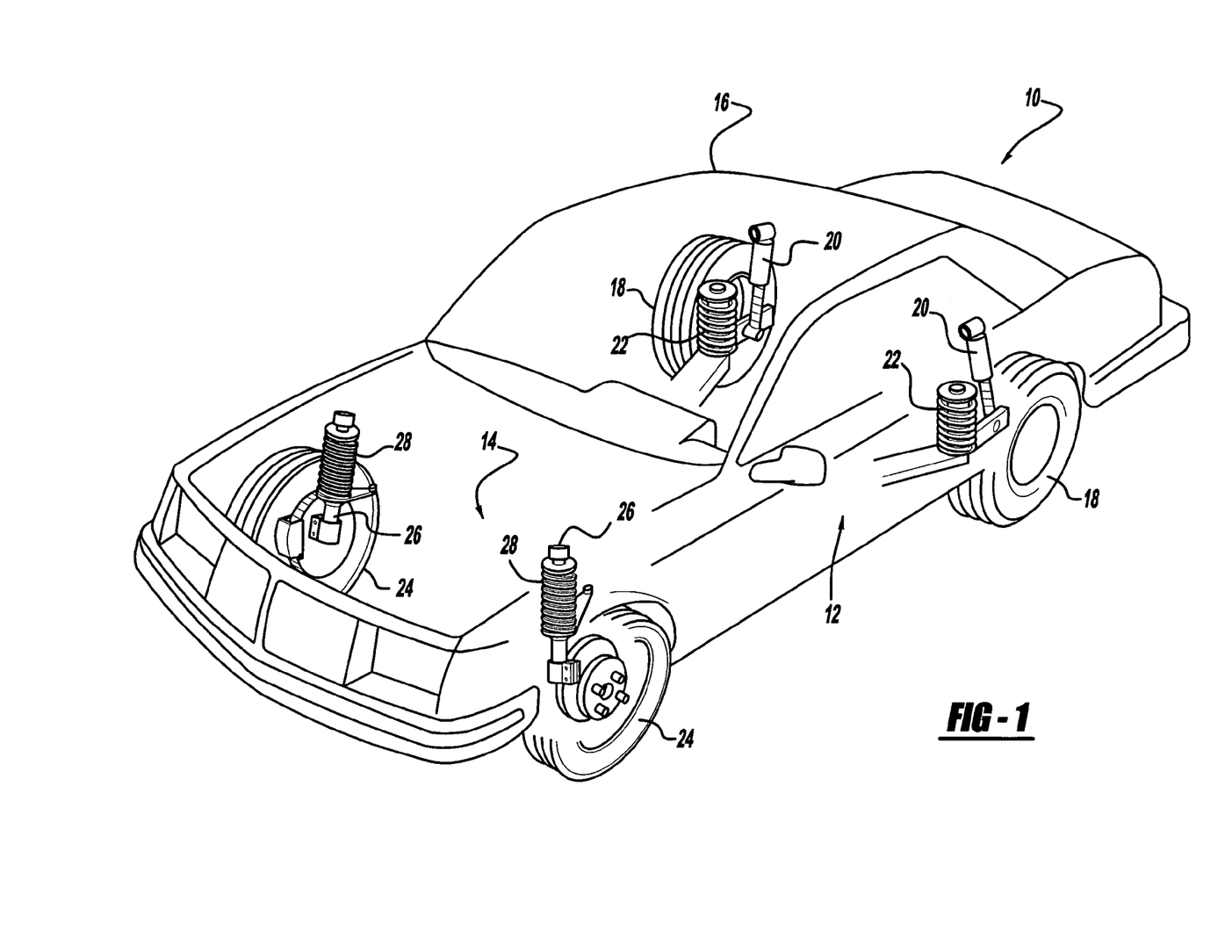
FIG. 1 is an illustration of an automobile using the multi-force damping force generating device in accordance with the present invention.

Referring now to the drawings in which like reference numerals designate like or corresponding parts throughout the several views, there is shown in FIG. 1 a vehicle incorporating a suspension system having the shock absorbers in accordance with the present invention which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e., front and rear suspensions 12 and 14, respectively) and the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating independent front and/or independent rear suspension systems. Further, the term "shock absorber" as used herein is meant to refer to dampers in general and thus will include McPherson struts.

Figure 2:
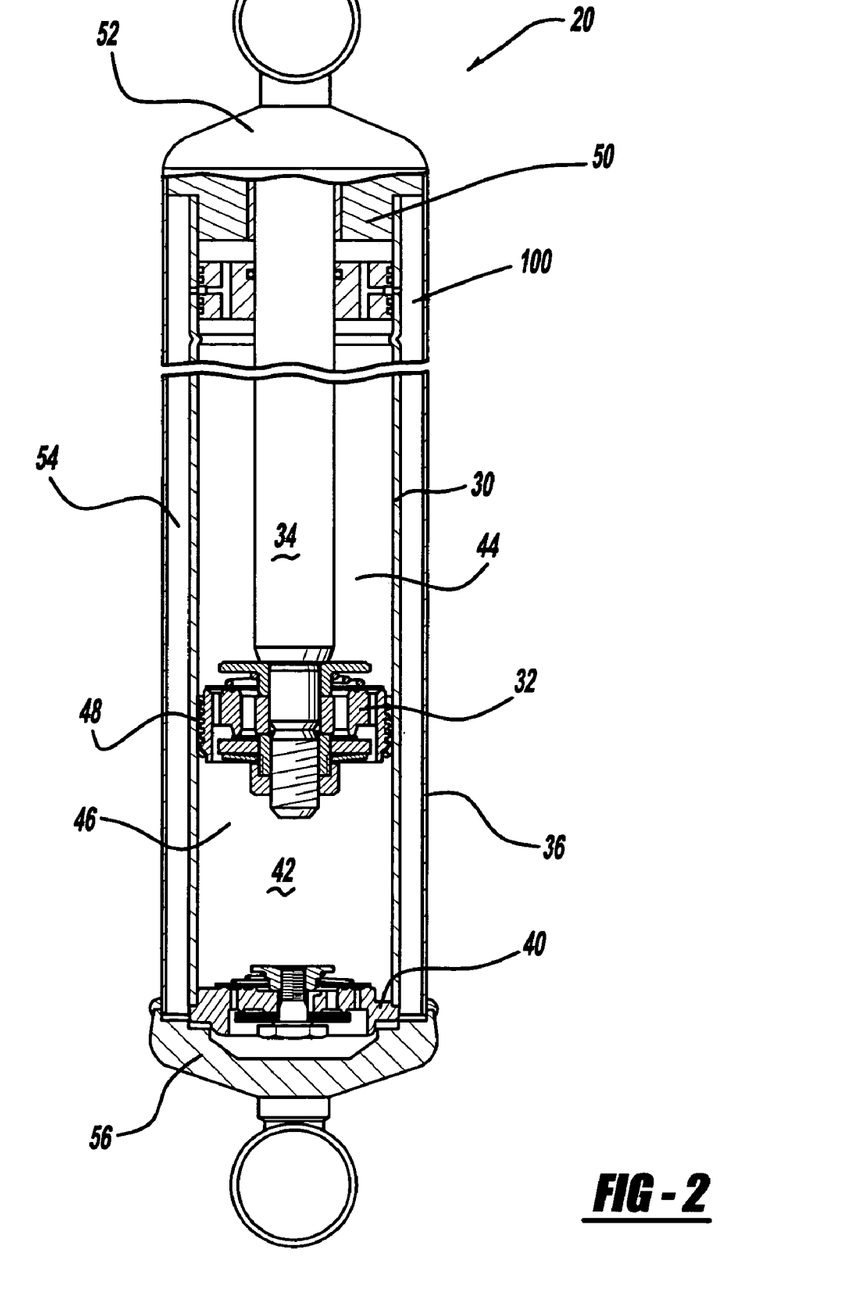
FIG. 2 is a cross-sectional side view of a dual-tube shock absorber incorporating the multi-force damping force generating device in accordance with the present invention.

Referring now to FIG. 2, shock absorber 20 is shown in greater detail. While FIG. 2 shows only shock absorber 20, it is to be understood that shock absorber 26 also includes the valving in accordance with the present invention described below for shock absorber 20. Shock absorber 26 differs from shock absorber 20 in the way in which it is adapted to be connected to the sprung and unsprung portions of vehicle 10. Shock absorber 20 comprises a pressure tube 30, a piston 32, a piston rod 34, a reservoir tube 36 and a base valve assembly 40.

Pressure tube 30 defines a working chamber 42. Piston 32 is slidably disposed within pressure tube 30 and divides working chamber 42 into an upper working chamber 44 and a lower working chamber 46. A seal 48 is disposed between piston 32 and pressure tube 30 to permit sliding movement of piston 32 with respect to pressure tube 30 without generating undue frictional forces as well as sealing upper working chamber 44 from lower working chamber 46. Piston rod 34 is attached to piston 32 and extends through upper working chamber 44 and through a rod guide 50 which closes the upper end of both pressure tube 30 and reservoir tube 36. A sealing system 52 seals the interface between rod guide 50, pressure tube 30, reservoir tube 36 and piston rod 34. The end of piston rod 34 opposite to piston 32 is adapted in the preferred embodiment, to be secured to the sprung portion of vehicle 10. Valving in piston 32 controls the movement of fluid between upper working chamber 44 and lower working chamber 46 during movement of piston 32 within pressure tube 30. Because piston rod 34 extends only through upper working chamber 44 and not lower working chamber 46, movement of piston 32 with respect to pressure tube 30 causes a difference in the amount of fluid displaced in upper working chamber 44 than the amount of fluid displaced in lower working chamber 46. This difference in the amount of fluid displaced is known as the "rod volume" and it flows through base valve assembly 40.

Reservoir tube 36 surrounds pressure tube 30 to define a reservoir chamber 54 located between the tubes. The bottom end of reservoir tube 36 is closed by an end cap 56 which is adapted, in the preferred embodiment, to be connected to the unsprung portion of vehicle 10. The upper end of reservoir tube 36 is attached to rod guide 50. Base valve assembly 40 is disposed between lower working chamber 46 and reservoir chamber 54 to control the flow of fluid between the two chambers. When shock absorber 20 extends in length (rebound), an additional volume of fluid is needed in lower working chamber 46 due to the "rod volume" concept. Thus, fluid will flow from reservoir chamber 54 to lower working chamber 46 through base valve assembly 40. When shock absorber 20 compresses in length (compression), an excess volume of fluid must be removed from lower working chamber 46 due to the "rod volume" concept. Thus, fluid will flow from lower working chamber 46 to reservoir chamber 54 through base valve assembly 40.

The present invention is directed towards a micro amplitude damping valve assembly 100 which provides reliable small amplitude damping characteristics for shock absorber 20.

Figure 3:
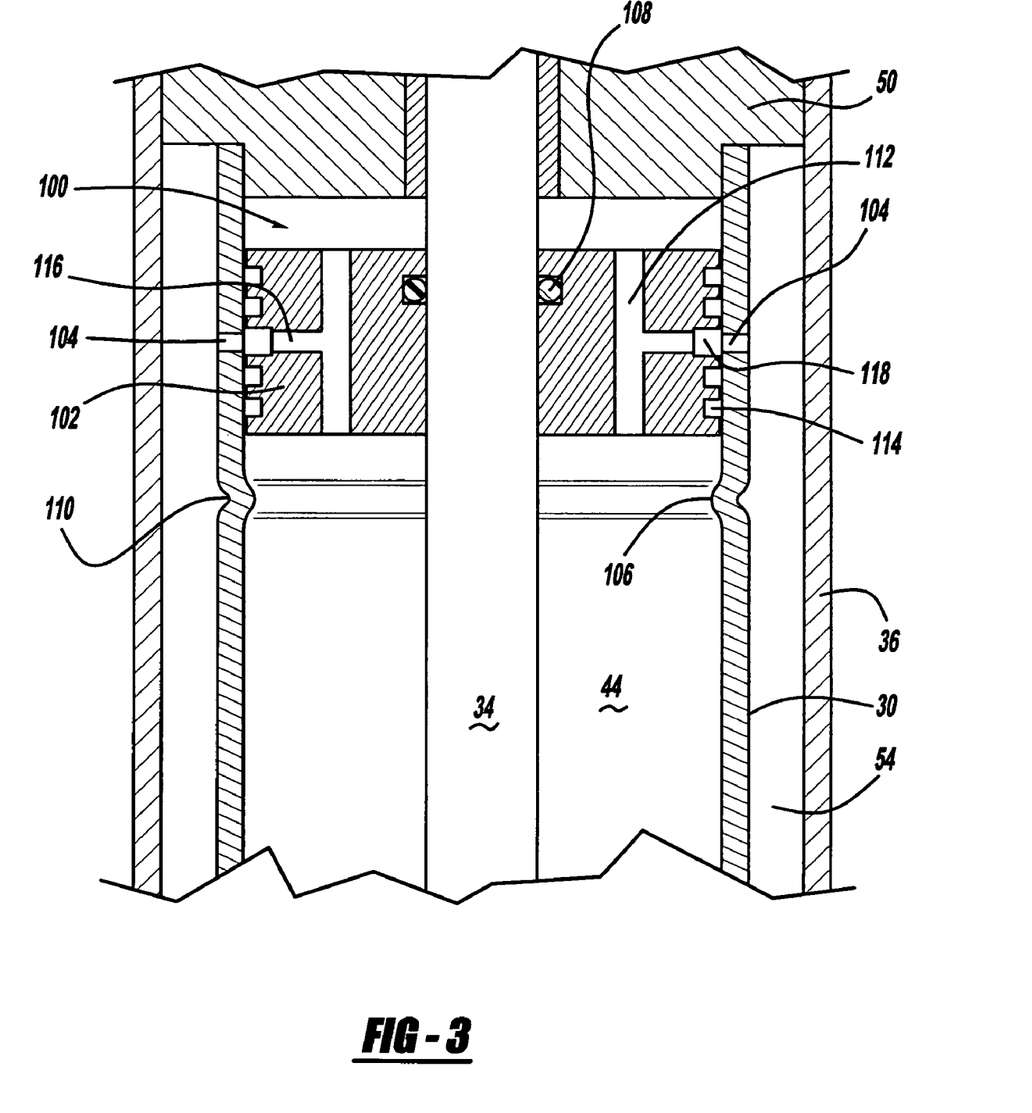
FIG. 3 is an enlarged cross-sectional side view illustrating the upper piston of the shock absorber shown in FIG. 1.

Referring now to FIG. 3, damping valve assembly 100 comprises a spool valve 102, a plurality of holes 104 extending through an upper end of pressure tube 30, and a retainer 106. Spool valve 102 is dimensioned to have a tight slip fit with respect to the inner diameter of the pressure tube 30. The inner diameter of spool valve 102 is dimensioned to have a loose fit with respect to piston rod 34. The inner diameter of spool valve 102 includes a friction control device 108 which provides a greater amount of friction between piston rod 34 and spool valve 102 than the amount of friction developed between spool valve 102 and pressure tube 30. This will result in spool valve 102 following the axial motion of piston rod 34 for small displacements. For larger displacements, spool valve 102 will be constrained by rod guide 50 in the rebound direction and by retainer 106 in the compression direction. Retainer 106 can comprise a snap ring disposed within pressure tube 30 or a precisely placed indentation 110 formed into pressure tube 30.

Figure 4:
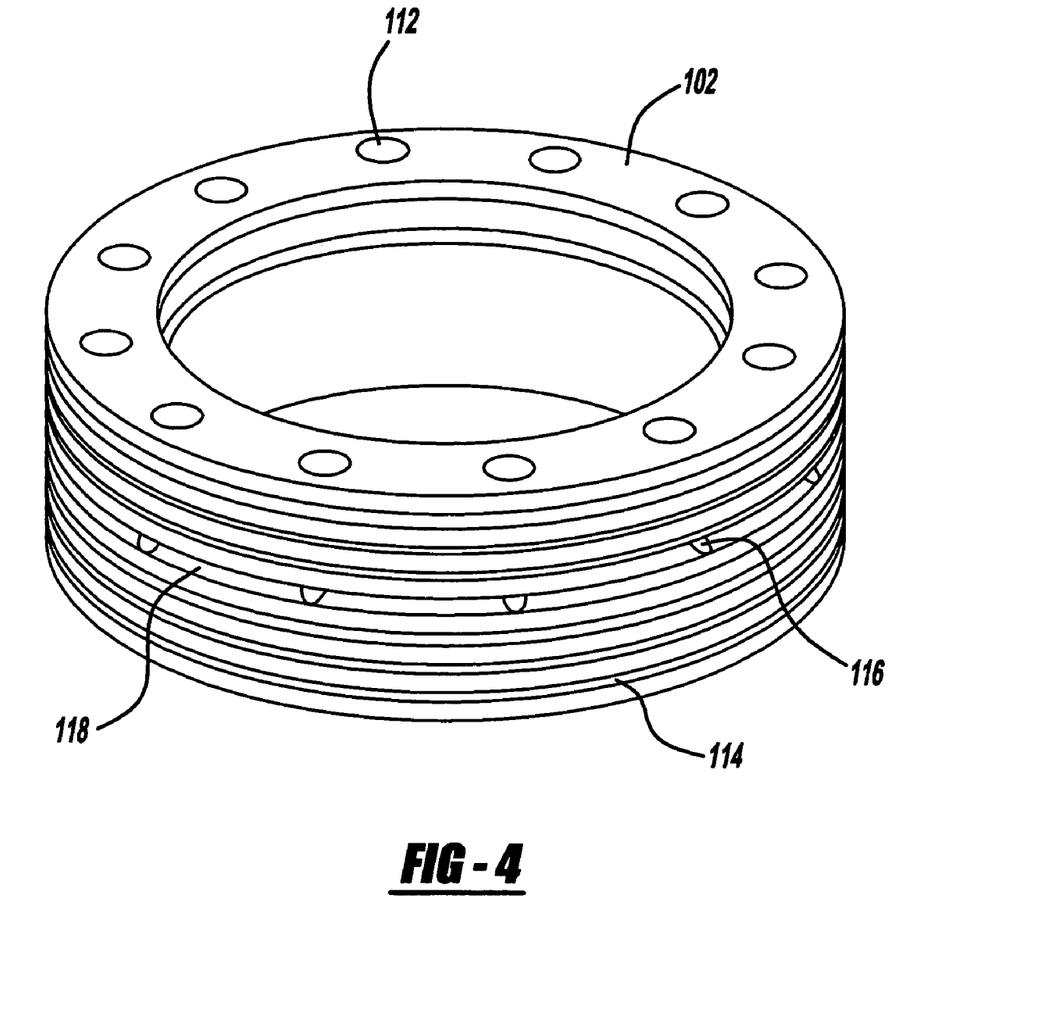
FIG. 4 is a perspective view illustrating the upper piston of the shock absorber shown in FIG. 1.

Spool valve 102 defines a plurality of axial holes 112 which ensure a near zero pressure drop across spool valve 102 for axial motion of spool valve 102. Concentric grooves 114 evenly placed on the outside circumferences of spool valve 102 are provided to increase the localized pressure drop for axial flow within the region between the outside diameter of spool valve 102 and the inside diameter of pressure tube 30. Additionally, grooves 114 serve to allow equalization of pressure around the outside circumference thereby causing spool valve 102 to center itself with respect to pressure tube 30. A plurality of radial holes 116 extend from outside circumference of spool valve 102 and open into respective axial holes 112 but radial holes 116 do not extend entirely through spool valve 102. When spool valve 102 is in its mean position, radial holes 116 align with and are in communication with the plurality of holes 104 extending through the upper end of pressure tube 30. A groove 118 is provided at the center of radial holes 116 to eliminate the need to orient radial holes 116 and the plurality of holes 104.

Thus, for near micro amplitude axial movements of piston rod 34 (<1 mm) hydraulic fluid is allowed to pass between upper working chamber 44 to reservoir chamber 54 of shock absorber 20. This is the condition for very low amplitude motion of piston rod 34 in both the compression and rebound directions. For larger amplitude motions of piston rod 34, radial ports 116 misalign with holes 104 and flow is prevented from passing between upper working chamber 44 and reservoir chamber 54. During the larger amplitude motions of piston rod 34, spool valve 102 will contact rod guide 50 during a rebound stroke and spool valve 102 will contact retainer 106 during a compression stroke. Thus, both rod guide 50 and retainer 106 operate as positive stops for spool valve 102.

Figure 5:
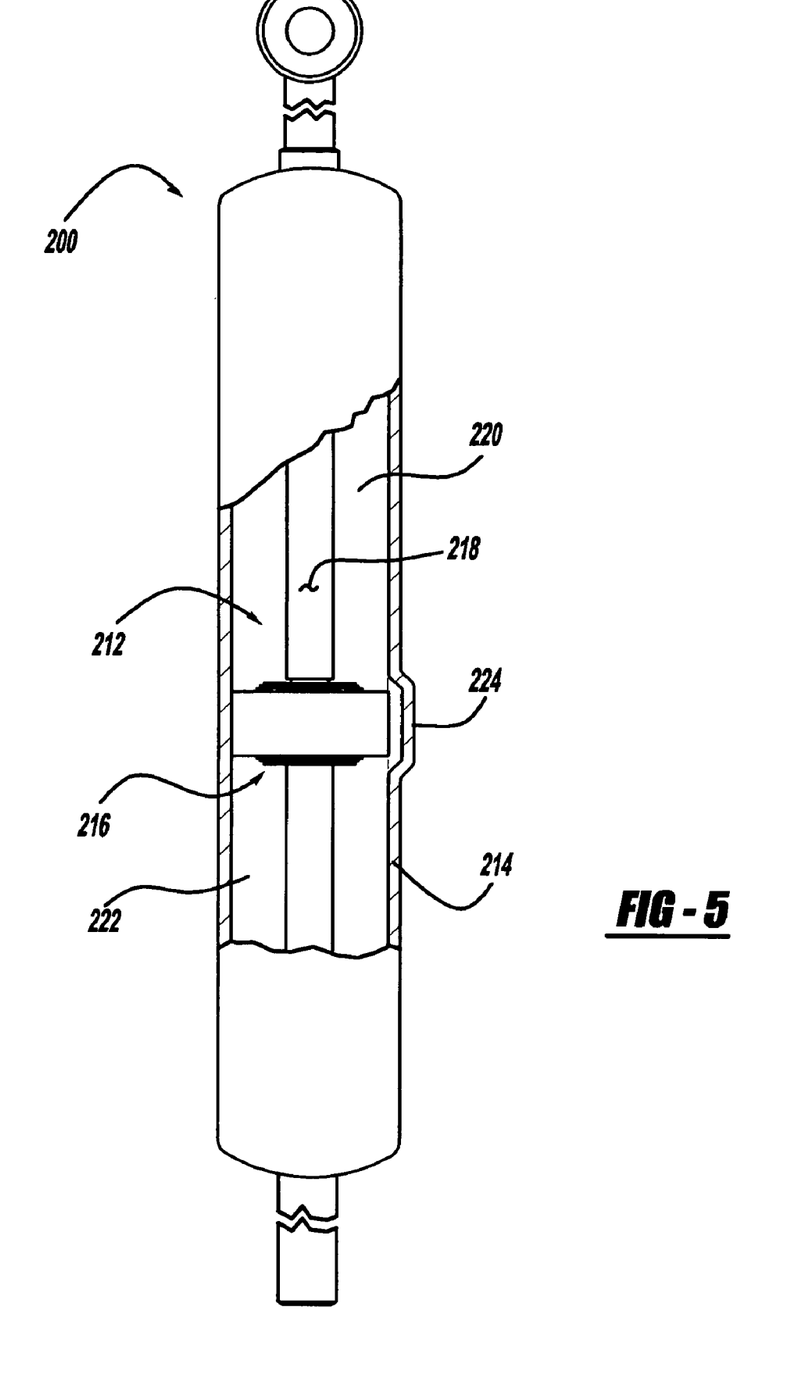
FIG. 5 is a cross-sectional side view illustrating a shock absorber in accordance with another embodiment of the present invention.

An additional embodiment which has the capability to produce low amplitude shock performance is illustrated in FIG. 5. FIG. 5 illustrates shock absorber 200. Shock absorber 200 is a mono-tube design and comprises a piston rod assembly 212 and a pressure tube 214. Piston rod assembly 212 includes a piston valve assembly 216 and a piston rod 218. Valve assembly 216 divides pressure tube 214 into an upper working chamber 220 and a lower working chamber 222. Piston rod 218 extends out of pressure tube 214, for attachment of one of the sprung or unsprung mass of the vehicle. Pressure tube 214 is filled with fluid and attaches to the other sprung or unsprung masses of the vehicle. Thus, suspension movements of the vehicle will cause extension or compression movement of piston rod assembly 212 with respect to pressure tube 214 and these movements will be dampened due to the restricted fluid flow between chambers 220 and 222 through piston valve assembly 216.

Piston rod 218 emanates axially from both ends of valve assembly 216. Seals are required at each end of shock absorber 200 and clearance for the motion of piston rod 218 is required at both ends of shock absorber 200. The key operating characteristics of the through rod shock is a lack of change in volume for working chambers 220 and 222 with any displacement or the elimination of the "rod volume" concept.

Therefore, a simple position sensitive bypass of valve assembly 216 would suffice to relieve low amplitude pressure within the working chambers 220 and 222. The design would employ a flow path which bypasses the piston for low amplitude movements of piston rod 218 while closing the flow path for larger movements of piston rod 218. The flow path could be placed in piston rod 218, it could be external to the working chamber such as an additional concentric tube or it could be an indentation 224 in pressure tube 214. This will provide the necessary relief of pressure to achieve desirable low amplitude performance.

Figure 6:
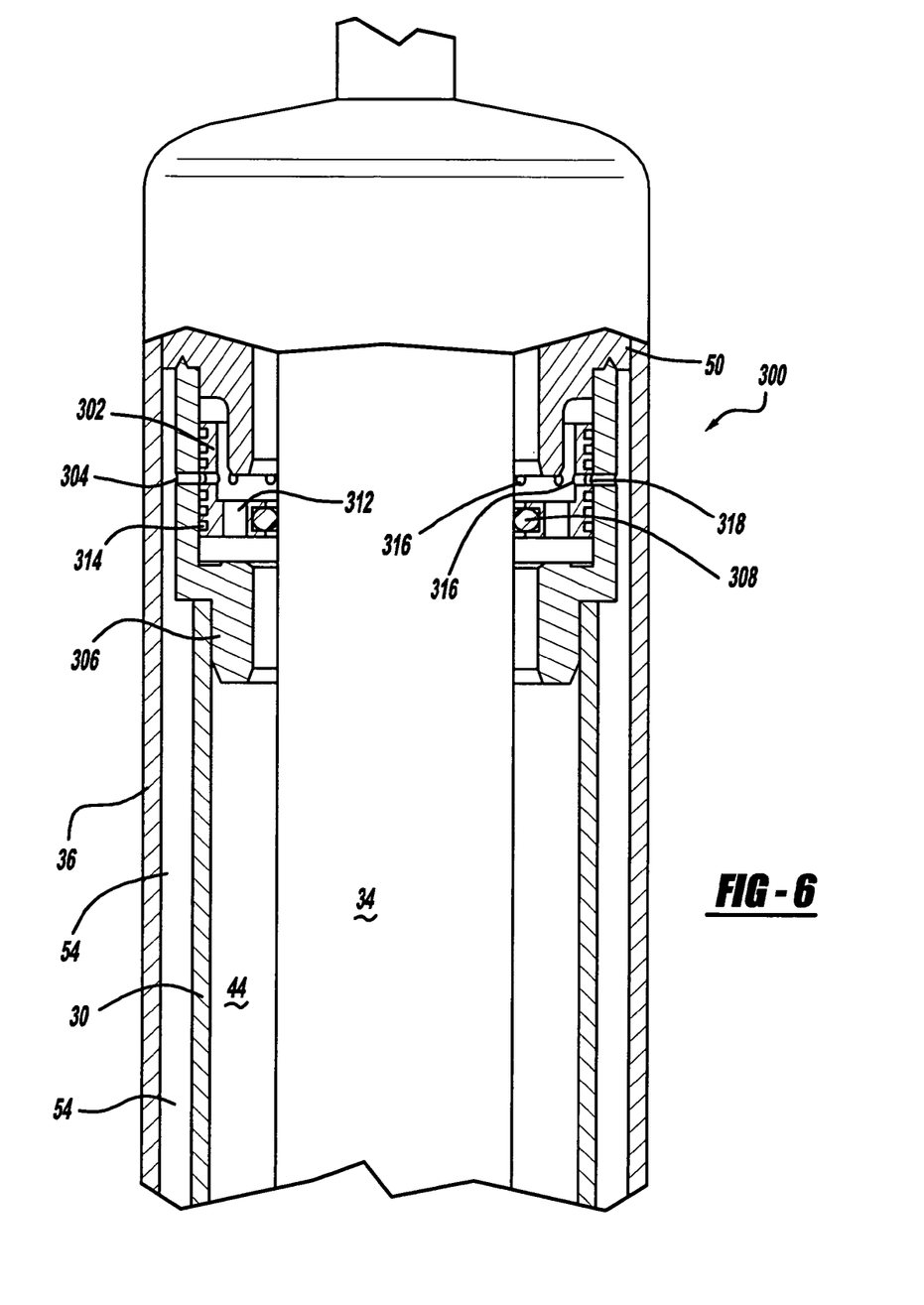
FIG. 6 is an enlarged cross-sectional side view illustrating an upper piston in accordance with another embodiment of the present invention.

Referring now to FIG. 6, a micro amplitude damping valve assembly 300 in accordance with another embodiment of the present invention is illustrated. Valve assembly 300 is a replacement for valve assembly and is shown incorporated into shock absorber 20.

Damping valve assembly 300 comprises a spool valve 302, a plurality of holes 304 extending through a lower rod guide 306. Lower rod guide 306 is secured to rod guide 50 by a press fit or by other means known in the art. Once assembled, lower rod guide 306 is held in position by the press fit as well as by pressure tube 30 which bears against base valve assembly 40 which in turn bears against end cap 56.

Spool valve 302 is dimensioned to have a tight slip fit with respect to the inner diameter of lower rod guide 306. The inner diameter of spool valve 302 is dimensioned to have a loose fit with respect to piston rod 34. The inner diameter of spool valve 302 includes a friction control device 308 which provides a greater amount of friction between piston rod 34 and spool valve 302 than the amount of friction developed between spool valve 302 and lower rod guide 306. This will result in spool valve 302 following the axial motion of piston rod 34 for small displacements. For larger displacements, spool valve 302 will be constrained by rod guide 50 in the rebound direction and by lower rod guide 306 in the compression direction.

Spool valve 302 defines a plurality of axial holes 312 which ensure a near zero pressure drop across spool valve 302 for axial motion of spool valve 302. Concentric grooves 314 evenly placed on the outside circumferences of spool valve 302 are provided to increase the localized pressure drop for axial flow within the region between the outside diameter of spool valve 302 and the inside diameter of lower rod guide 306. Additionally, grooves 314 serve to allow equalization of pressure around the outside circumference thereby causing spool valve 302 to center itself with respect to lower rod guide 306. A plurality of radial holes 316 extend from outside circumference of spool valve 302 and extend entirely through spool valve 302. When spool valve 302 is in its mean position, radial holes 316 and a groove 318 align with and are in communication with the plurality of holes 304 extending through the upper end of lower rod guide 306. Groove 318 is provided at the center of radial holes 316 to eliminate the need to orient radial holes 316 and the plurality of holes 304.

Thus, for near micro amplitude axial movements of piston rod 34 (<1 mm) hydraulic fluid is allowed to pass between upper working chamber 44 to reservoir chamber 54 of shock absorber 20. This is the condition for very low amplitude motion of piston rod 34 in both the compression and rebound directions. For larger amplitude motions of piston rod 34, radial groove 318 misaligns with holes 304 and flow is prevented from passing between upper working chamber 44 and reservoir chamber 54. During the larger amplitude motions of piston rod 34, spool valve 302 will contact rod guide 50 during a rebound stroke and spool valve 302 will contact lower rod guide 306 during a compression stroke. Thus, both rod guide 50 and lower rod guide 306 operate as positive stops for spool valve 102.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A damper comprising:
   a pressure tube defining a working chamber;
   a piston disposed within the pressure tube, the piston dividing the working chamber into an upper working chamber and a lower working chamber;
   a piston rod secured to the piston, the piston rod extending through one end of the working chamber;
   a reserve tube surrounding the pressure tube to define a reserve chamber between the reserve tube and the pressure tube;
   a first valve disposed between the working chamber and the reserve chamber, the first valve defining a first flow path between the working chamber and the reserve chamber; and
   a second valve slidingly engaging the pressure tube and slidingly engaging the piston rod, the second valve defining a second flow path between the working chamber and the reserve chamber.

2. The damper according to claim 1, wherein the second valve is movable between a first position where the second flow path is open and a second position where the second flow path is closed.

3. The damper according to claim 1, wherein the second valve is disposed within the upper working chamber.

4. The damper according to claim 3, wherein the second valve is movable between a first position where the second flow path is open and a second position where the second flow path is closed.

5. A damper comprising:

a pressure tube defining a working chamber;

a piston disposed within the pressure tube, the piston dividing the working chamber into an upper working chamber and a lower working chamber;

a piston rod secured to the piston, the piston rod extending through the upper working chamber;

a reserve tube surrounding the pressure tube to define a reserve chamber between the reserve tube and the pressure tube;

a first valve disposed between the lower working chamber and the reserve chamber, the first valve defining a first flow path between the lower working chamber and the reserve chamber; and a second valve disposed between the upper working chamber and the reserve chamber, the second valve defining a second flow path between the upper working chamber and the reserve chamber, the second valve slidingly engaging the pressure tube and slidingly engaging the piston rod.

6. The damper according to claim 5, wherein the second valve is movable between a first position where the second flow path is open and a second position where the second flow path is closed.

7. A damper comprising:

a pressure tube defining a working chamber;

a piston disposed within the pressure tube, the piston dividing the working chamber into an upper working chamber and a lower working chamber;

a piston rod secured to the piston, the piston rod extending through one end of the working chamber;

a reserve tube surrounding the pressure tube to define a reserve chamber between the reserve tube and the pressure tube;

a first valve disposed between the working chamber and the reserve chamber, the first valve defining a normally closed flow path between the working chamber and the reserve chamber; and a second valve disposed within the pressure tube, the second valve defining a normally open flow path between the working chamber and the reserve chamber, the second valve slidingly engaging the piston rod.

8. The damper according to claim 7, wherein the second valve slidingly engages the pressure tube.

9. The damper according to claim 7, wherein the second valve is disposed within the upper working chamber.

10. A damper comprising:

a pressure tube defining a working chamber;

a piston disposed within the pressure tube, the piston dividing the working chamber into an upper working chamber and a lower working chamber;

a piston rod secured to the piston, the piston rod extending through one end of the working chamber;

a reserve tube surrounding the pressure tube to define a reserve chamber between the reserve tube and the pressure tube;

a first valve disposed between the working chamber and the reserve chamber, the first valve defining a first flow path between the working chamber and the reserve chamber; and a second valve disposed within the pressure tube and slidingly secured directly to the piston rod, the second valve defining a second flow path between the working chamber and the reserve chamber.

11. The damper according to claim 10, wherein the second valve is movable between a first position where the second flow path is open and a second position where the second flow path is closed.

12. The damper according to claim 10, wherein the second valve is disposed within the upper working chamber.

* * * * *